(12) United States Patent
Qi et al.

(10) Patent No.: US 9,183,429 B2
(45) Date of Patent: Nov. 10, 2015

(54) METHOD AND APPARATUS FOR FACIAL RECOGNITION

(71) Applicant: QUALCOMM Incorporated, San Diego, CA (US)

(72) Inventors: Yingyong Qi, San Diego, CA (US); Ning Bi, San Diego, CA (US); Feng Guo, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 181 days.

(21) Appl. No.: 13/744,906

(22) Filed: Jan. 18, 2013

(65) Prior Publication Data

US 2014/0050372 A1  Feb. 20, 2014

Related U.S. Application Data

(60) Provisional application No. 61/683,574, filed on Aug. 15, 2012.

(51) Int. Cl.
*G06K 9/00* (2006.01)
*G06K 9/62* (2006.01)
*G06K 9/46* (2006.01)

(52) U.S. Cl.
CPC ........ *G06K 9/00221* (2013.01); *G06K 9/00288* (2013.01); *G06K 9/6232* (2013.01); *G06K 9/6255* (2013.01); *G06K 2009/4666* (2013.01)

(58) Field of Classification Search
None
See application file for complete search history.

(56) References Cited

U.S. PATENT DOCUMENTS

| | | | |
|---|---|---|---|
| 6,466,685 B1 | 10/2002 | Fukui et al. | |
| 7,835,547 B2 | 11/2010 | Kawata | |
| 2003/0215114 A1 | 11/2003 | Kyle | |
| 2004/0005086 A1* | 1/2004 | Wolff et al. | 382/118 |
| 2007/0258644 A1 | 11/2007 | Kawahara et al. | |
| 2008/0317350 A1 | 12/2008 | Yamaguchi et al. | |
| 2011/0013845 A1 | 1/2011 | Tu et al. | |
| 2011/0103695 A1* | 5/2011 | Sato et al. | 382/190 |
| 2012/0213422 A1* | 8/2012 | Niskanen et al. | 382/118 |
| 2013/0294642 A1* | 11/2013 | Wang et al. | 382/103 |

OTHER PUBLICATIONS

Timo Ahonen. Abdenour Hadid, and Matti Pietikainen "Face Description with Local Binary Patterns: Applications to Face Recognition", Dec. 2006, IEEE Transactions on Pattern Analysis and machine Intelligence, vol. 28, No. 12, pp. 2037-2041.*
David Beymer "Pose-Invariant Face Recognition Using Real and Virtual Views", Mar. 1996, A.I. Technical Report No. 1574, pp. 186.*

(Continued)

*Primary Examiner* — Siamak Harandi
(74) *Attorney, Agent, or Firm* — Knobbe Martens Olson & Bear, LLP (57) ABSTRACT

Apparatus and methods for facial detection are disclosed. A plurality of images of an observed face is received for identification. Based at least on two or more selected images of the plurality of images, a template of the observed face is generated. In some embodiments, the template is a subspace generated based on feature vectors of the plurality of received images. A database of identities and corresponding facial data of known persons is searched based at least on the template of the observed face and the facial data of the known persons. One or more identities of the known persons are selected based at least on the search.

21 Claims, 7 Drawing Sheets

(56) References Cited

OTHER PUBLICATIONS

Barr J.R., et al., "Face Recognition From Video: A Review. Draft17", International Journal of Pattern Recognition and Artificial Intelligence, May 14, 2012, p. 1266002, XP055089170, DOI: 10.1142/80218001412660024.

Chaari A., et al., "A New Clustering Approach for Face Identification," Image Processing Theory, Tools and Applications, 2008. IPTA 2008. First Workshops on, IEEE, Piscataway, NJ, USA, Nov. 23, 2008, pp. 1-6, XP031404007, ISBN: 978-1-4244-3321-6 sections 1-3.

Huang D., et al., "Local Binary Patterns and Its Application to Facial Image Analysis: A Surve," IEEE Transactions on Systems, Man, and Cybernetics: Part C: Applications and Reviews, IEEE Service Center, Piscataway, NJ, US, vol. 41, No. 6, Nov. 1, 2011, pp. 765-781, XP011363204, ISSN: 1094-6977, DOI: 10.1109/TSMCC.2011.2118750 abstract sections I, III, V, VI.

International Search Report and Written Opinion—PCT/US2013/053973—ISA/EPO—Nov. 29, 2013.

\* cited by examiner

METHOD AND APPARATUS FOR FACIAL RECOGNITION

CROSS-REFERENCE TO RELATED APPLICATIONS

The application claims the priority benefit of U.S. Provisional Application No. 61/683,574, entitled "METHOD AND APPARATUS FOR FACIAL RECOGNITION," filed Aug. 15, 2012, the entirety of which is incorporated herein by reference.

FIELD

The present disclosure relates generally to image processing. More specifically, the disclosure is directed to facial recognition.

BACKGROUND

Advances in technology have resulted in portable devices with increasingly powerful computing and communication capabilities. For example, there currently exist a variety of portable computing devices, such as portable wireless telephones, personal digital assistants (PDAs), laptop computers, tablet personal computers, eBook viewers, and the like. More specifically, many of these devices can include digital imaging sensors for taking photos and video, and can communicate voice and data packets over wired or wireless networks. Accordingly, such portable devices may be capable of downloading videos and images. In one implementation, a cellular phone can store a contact list of persons known to the user. The user may also be able to selectively assign a picture to selected contacts. Pictures may be received by capturing the image with a camera on the phone, or by downloading the appropriate picture from a network such as the Internet.

Additionally, advances in facial recognition have resulted in systems capable of identifying an unknown persons in some circumstances. These systems may require performing prior training involving multiple images of the person to be identified. In some examples, the training process is performed in an offline manner to ensure the correctness of the training process.

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description" one will understand how the features of this invention provide advantages that include reducing the number of images of known faces necessary to perform facial recognition of an observed face.

One embodiment is a computer-implemented method of facial recognition. The method can include receiving a plurality of images of an observed face for identification, generating a template of the observed face based at least on two or more selected images of the plurality of images, searching a database of identities and corresponding facial data of known persons, and selecting one or more identities of the known persons based at least on the search. The searching can be based at least on the template of the observed face and the facial data of the known persons. In various embodiments, the computer-implemented method can further include capturing the plurality of images of the observed face with an image sensor. Each identity of the database can be associated with data that is based on one reference image. Generating the template of the observed face can include generating a subspace of the observed face based at least on feature vectors of the two or more selected images of the plurality of images. In some embodiments, the feature vectors can be based at least on linear binary pattern histograms of the selected images. In other embodiments, the feature vectors can be based at least on a cascade of filtered image blocks. The subspace can be associated with a mean and a variance of the feature vectors of the two or more selected images of the plurality of images. Searching the database can include determining an error measure between the template of the observed face and each of one or more of the corresponding facial data of the known persons, wherein the error measure can be based on a Chi-square distance. The selection of the one or more identities may be based on a threshold of the error measure. Some embodiments of the computer-implemented method can further include selecting the two or more images of the plurality of images based on orientation of the observed face. The selection of the two or more images of the plurality of images can further be based on a facial feature of interest. The selection of the two or more images of the plurality of images can further be based on facial orientation of the facial data of the database. Some embodiments of the computer-implemented method can further include displaying on a graphical display data indicative of the one or more selected identities. Some embodiments of the computer-implemented method can further include prompting a user to confirm the selection of the two or more selected identities, and updating the database in response to the confirmation of the user.

Yet another embodiment is a facial recognition apparatus. The apparatus can include an image receiver module, a template module, a search module, and a recognition module. The image receiver module can include instructions that configure a processor to receive a plurality of images of an observed face for identification. The template module can include instructions that configure the processor to generate a template of the observed face based at least on two or more selected images of the plurality of images. The search module can include instructions that configure the processor to search a database of identities and corresponding facial data of known persons.

Still another embodiment is a non-transitory, computer-readable medium storing instructions that when executed, can cause a processor to perform a method of receiving a plurality of images of an observed face for identification, generating a template of the observed face based at least on two or more selected images of the plurality of images, searching a database of identities and corresponding facial data of known persons, and selecting one or more identities of the known persons based at least on the search.

DETAILED DESCRIPTION

Embodiments of the invention relate to systems and methods for identifying an unknown person from multiple images. In one embodiment, the system captures multiple images of a person to be recognized and develops a pattern of the person's face or facial features from the images to be compared against reference images from a database of known persons. For example, a subspace could be calculated by calculating feature vectors of several images of the person's face, and this subspace can be compared to a reference feature vector of a known person. In one embodiment, the system can be implemented in a portable computing device, such as a cellular phone. For example, a user can use a phone equipped with a camera to capture video of a colleague entering a meeting and compare those multiple images from the video to single images of colleagues in a database stored on the phone or a server to identify the name of the colleague.

In one specific example, the system may be implemented onto a handheld portable device with an imaging sensor and database of contacts. When a person enters a room, a user could take a plurality of images of the person, and the system could develop a composite image, and compare that composite image against all of the images stored with their contacts. If the composite image matches with a person in the contact database, then the name, title and image of the person entering the room would be displayed to the user. This would allow the user to identify each person within a meeting without needing to ask for each person's name.

The disclosed methods, apparatus, and systems may function with only one facial image for per person in the training process. This may better accommodate legacy facial recognition databases, which may provide only one reference image per person. The disclosed facial recognition method collects more than one facial image of an unknown or observed person during a recognition process. The collection of multiple images can be possible due to the frame rate (≥30 frame per second) of modern digital cameras, for example, those integrated with mobile devices such as cell phones. These multiple facial images can be used to build a template or subspace of the facial images of the observed or unknown person. The reference facial data or images of known individuals in the database are then compared with the template or subspace. The reference image that provides the closest match can be identified and recognized. It may also be useful in application environments with limited computing resources, for example, those of mobile devices.

Examples of a template of a face include, but is not limited to, the results of aggregating or combining multiple facial images to form a composite, model, pattern, or code of the images. In one embodiment, the images are stored in reduced form to save on storage space within the system. A subspace of multiple images is an example of a template. An image formed by combining or comparing multiple images (for example, by a pooling operation) is another example of a template.

Examples of facial data include, for example, images and templates. In one embodiment, facial data are stored in a reference database in template form, for example, to reduce storage space or processing during operation.

Figure 1:
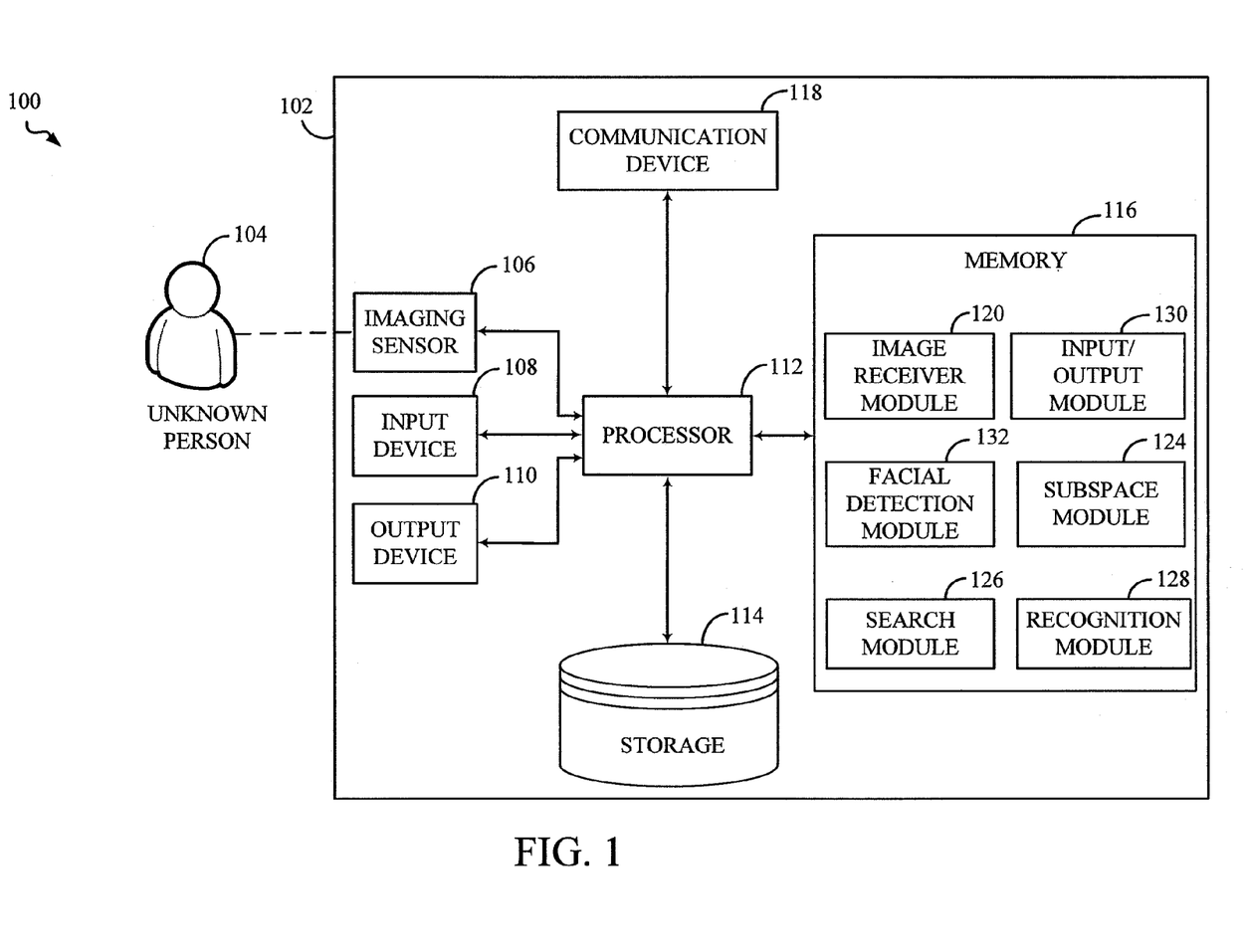
FIG. 1 is a block diagram showing a system to identify an unknown person from one reference image of a known person according to one embodiment.

FIG. 1 shows a system 100 to identify an unknown person from one reference image of a known person according to one embodiment. The system 100 includes an electronic device 102 to identify an unknown person 104. The electronic device 102 includes an image sensor 106, an input device 108, an output device 110 coupled to a processor 112. The processor 112 is also coupled to a storage 114, a memory 116, and a communication device 118. The memory 116 includes an image receiver module 120, a subspace module 124, a search module 126, a recognition module 128, and an input/output (I/O) module 130. The electronic device 102 is configured to capture multiple images of the unknown person 104 and identify the unknown person's identity to a user (not shown).

The imaging sensor 106 is configured to capture and supply images in response to control from the processor 112 executing specific instruction of the image receiver module 120 of the memory 116. Examples of the imaging sensor 106 include digital charge-coupled device (CCD) cameras, infrared cameras, and the like. In some embodiments, the imaging sensor 106 is optional, and images of the unknown person 104 is, for example, stored in and retrieved from storage 114 or memory 116, or received from the input device 108 or the communication device 118, as will be discussed below with reference to FIG. 2.

The input device 108 can include a display, a keypad, a mouse, a touch screen, a microphone, a data drive or port (for example an optical disk drive or a universal serial bus (USB) port for portable data devices), or other like devices configured to provide input to the electronic device 102. For example, during operation the input device 108 can allow the user to initiate image capturing and facial recognition processes through a graphical user interface of the electronic device 102. Further, as described below, the input device 108 can allow the user to provide additional input to aid the facial recognition process, such as selecting between two or more reference images that satisfy some recognition criteria.

The output device 110 can be an optical display, a speaker, or other like devices configured to provide output under the control of the processor 112. During operation, the output device 110 can in some embodiments display a result of a search of a database of known-persons ("reference database"). For example, the output device 110 can be a display screen of a cellular phone that is configured to display an image and identity of a person selected from the reference database by the search module 126 and recognition module 128.

The input device 108 and the output device 110 may provide a user interface to control when data is collected for face recognition while a preview image is being displayed. Some implementations may also provide the user with more than one known facial image when the recognition process does not result in a high-confidence recognition of one image. In this case, the user may be provided with an ability to select which of the returned images is properly recognized as the observed face. The user may also be given the option to indicate that none of the displayed images is a proper match with the observed face.

The processor 112 includes circuitry, such as a microprocessor or microcontroller, configured to execute instructions from memory 116 and control and operate the imaging sensor 106, the input device 108, the output device 110, the storage 114, the memory 116, the communication device 118, and configured to control the processing of data to and from those devices.

The storage 114 and memory 116 include mechanisms configured for storing information by chemical, magnetic, electrical, optical, or the like means. For instance, the storage 114 and memory 116 can each be a non-volatile memory device, such as flash memory or a hard-disk drive, or a volatile memory device, such as dynamic-random access memory (DRAM) or static random-access memory (SRAM). The processor 112 can access the reference database by reading from the storage 114. FIG. 1 shows the storage and memory as part of the electronic device. For instance, the storage 114 could be non-volatile memory on a cell phone containing the reference database of known persons, such as a contact list. In some embodiments, however, the storage 114 may also be located remotely on a separate device and accessed by communication channels, for example over a network, as will be discussed in connection with FIG. 2.

The communication device 118 includes electronics configured to provide the processor 112 a communication interface for transmitting and receiving data, such as data related to the images of the unknown person or related to the reference database. For example, the processor 112 can be configured to request images or image related data of the known persons of the reference database. Communication can be wireless or wired communication over a computer or telecommunication network.

The image receiver module 120 includes instructions that configure the processor 112 to receive a plurality of images. In one embodiment, images may be received from the input device 108. In another embodiment, images may be directly received from the imaging sensor 106, which captures the images. In another embodiment, images may be received from a network (not shown) via the communication device 118. In yet another embodiment, images may be received by loading the image data from data storage, such as the storage 114, the memory 116, or a data storage device connected with the electronic device 102 via the input device 108.

Within the memory 116 is a facial detection module 132 that includes instructions that configure the processor 112 to identify one or more faces from images captured or input on images received by the system. For example, the facial detection module 132 can include instructions related to facial detection, feature detection, normalization of the facial images, and selection of two or more images from the plurality of received images. In one embodiment, selection is based on the orientation of the face in the corresponding image, such as a frontal face orientation. Examples of facial detection systems can be found, for example in U.S. Patent Application Publication No: 20110047384 filed on Feb. 24, 2011.

The memory 116 also includes a subspace module 124 that has instructions that configure the processor 112 to generate a subspace of facial features based on a plurality of images. For example, the subspace module 124 can include instructions related to feature vectorization, feature vector pooling or aggregation, and the like. In one embodiment, portions of the image corresponding to features (feature regions of interests (ROIs)) are converted to vectors by computing a histogram of linear binary patterns (LBPs) within the corresponding feature ROIs. In another embodiment, features may be filtered by a Gabor filter at various orientations and scales. For each scale or orientation, the results are pooled (for example, by taking a maximum or average result) to form a vector. Facial detection and subspace generation will be discussed in further detail with reference to FIGS. 3-7.

The memory 116 also includes a search module 126 that includes instructions that configure the processor 112 to search the reference database of known faces using a subspace of facial features created by executing the instructions of the subspace module 124. In some embodiments, the reference database can be accessible using the storage 114 or the input device 108. For example, in one embodiment, input device 108 may include an interface to an external storage device containing the reference database.

As will be described below in further detail, in operation searching the reference database includes comparing the subspace of the unknown person with one or more reference images from the reference database. For example, a reference feature vector of a known stored face in the database can be generated and projected onto the subspace of the unknown face to calculate a projection error. A projection error can then be computed for each reference feature vector of the reference database. Various measures can be used to calculate the projection error or the distance between the subspace and reference feature vector. For example, in some embodiments the Chi-square distance can be used. It will be appreciated, however, that other applicable measure can be used, such as Euclidean norms, $L^p$ norms, and the like.

Within the memory 116 is also a recognition module 128 that includes instructions that configure the processor 112 to recognize an observed subject in the plurality of stored images based, at least in part, on the results of the search. For example, the image and identity from the reference database associated with the smallest projection error can be chosen and associated with the unknown face. In some embodiments, two or more images and identities of the reference database can be chosen for user selection. The recognition module 128 may also include instructions for testing a threshold representing the maximum satisfactory projection error for a match. Reference images not satisfying the threshold will not qualify as a match with the subspace. In some embodiments, in the situation where there are no qualifying reference images, the recognition module can cause the processor 112 to indicate that there is no matching reference image via the output device 110.

The memory 116 is also shown with an I/O module 130 that includes instructions that configure the processor 112 to output a result of the recognition performed by module 128. The specific output may vary by embodiment. In some implementations, where the output device 110 is a display, the recognition output may be generated to the display. In some embodiments, the I/O module 130 can include instruction that configure the processor 112 to transmit or receive data via the communication device 118.

The instructions included in the image receiver module 120, subspace module 124, search module 126, recognition module 128, and I/O module 130 may be stored on a computer readable medium. For example, the storage 114 may store the instructions included in modules 120, 124, 126, 128, 130, 132.

The electronic device 102 for facial recognition is shown, and has been primarily described above, as being embodied in a single electronic device 102. In one embodiment, the electronic device 102 can achieve rapid facial recognition. For example, the processor 112 and the storage 114 can be connected by a data channel providing fast data rates. Additionally or alternatively, in one embodiment the electronic device 102 can achieve secure facial recognition because, for example, data related to facial or personal data need not be transmitted over a network.

Figure 2:
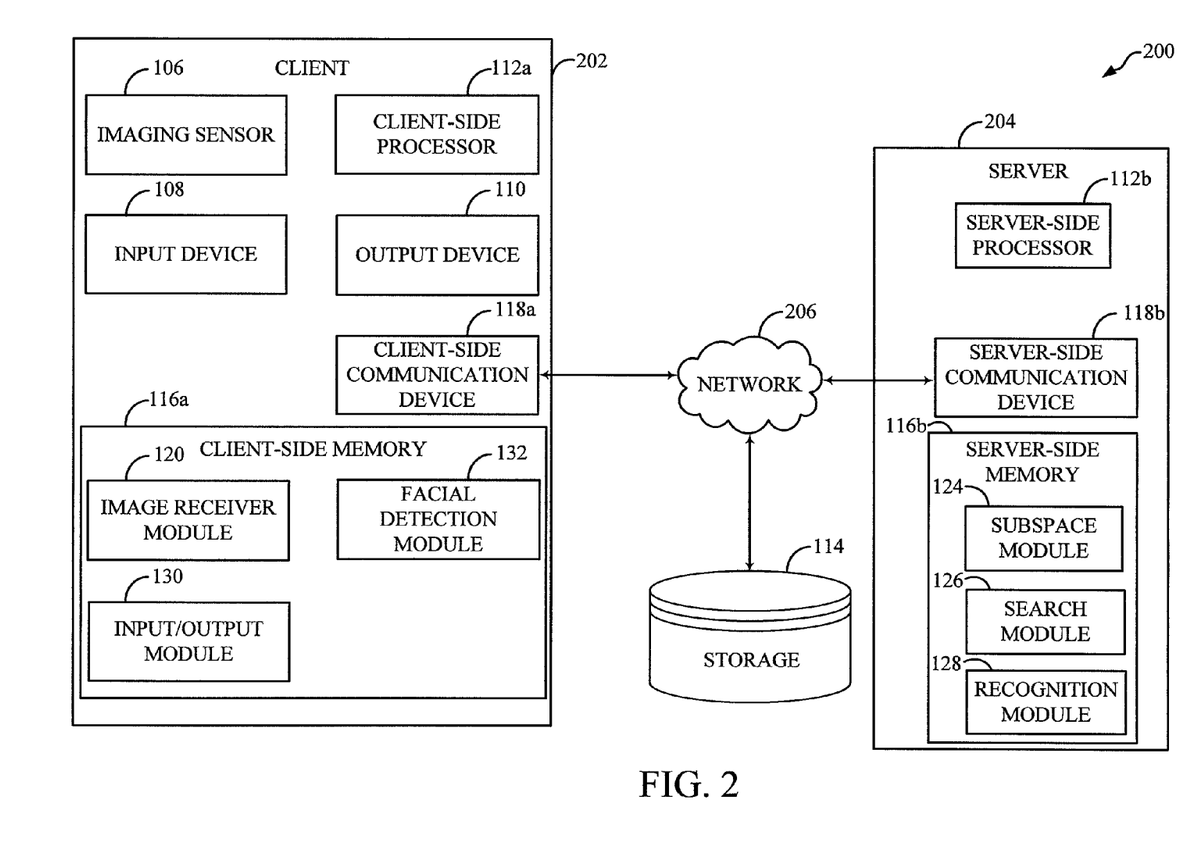
FIG. 2 is a block diagram showing an exemplary embodiment of a client-server system to identify an unknown person from multiple images.

In other embodiments the facial recognition process is distributed among various devices. For example, FIG. 2 shows an exemplary embodiment of a client-server system 200 to identify an unknown person from multiple images. Elements common to the systems 100, 200 of FIGS. 1 and 2 share common reference indicia, and only differences between the systems 100, 200 are described herein for the sake of brevity.

A client device 202 can be communicatively coupled to a server device 204 and a storage 114 by a network 206. Examples of the client device 202 can include networked devices or communication devices such as a cellular phone, a laptop, a tablet PC, and the like devices. The server device 204 can be a computer configured to provide the client device 202 facial recognition services. The network 206 can be a computer network (for example, the Internet), a telecommunication network (for example, wireless cellular communication network), or the like.

As shown in FIG. 2, the client device 202 includes an image sensor 106, an input device 108, an output device 110, a client-side processor 112*a*, a client-side communication device 118*a*, and a client-side memory 116*a* containing an image receiver module 120, an I/O module 130, and a facial detection module 132. The server device 204 includes a server-side processor 112*b*, a server-side communication device 118*b*, and a server-side memory 116*b* containing a subspace module 124, a search module 126, and a recognition module 128.

In operation, the client device 202 can capture multiple images of an unknown person with the imaging sensor 106 for identification of the unknown person. The client-side processor 112*a* executes instructions of the facial detection module 132 for facial detection and various preprocessing, such as facial image selection and normalization. Data pertaining to multiple facial images can be communicated to the server 204 over the network 206. The server 204 can process the communicated data and transmit or send the identification data to the client 202. For example, the server-side processor 112*b* can execute instructions from the subspace module 124 for generating a subspace from the communicated data pertaining to multiple images of the unknown person. The server-side processor 112*b* can then compare the generated subspace to the reference images contained in the reference database by executing instructions from the search module 126. The server 204 can then send the client 202 the image and/or the personal ID associated with the closest match to the subspace.

Some embodiments of client-server system 200 can reduce computational and storage requirements of the user's client device 202. For example, executing the instructions of the subspace module 124 and the search module 126 on the server device 204 instead of the client device 202 can reduce the required number of instructions executed on the client device 202. Additionally, storing the reference database externally to the client device 202 can reduce the required data storage on the client device 202. Accordingly, a distributed system can also improve power efficiency and battery life in some embodiments.

Figure 3:
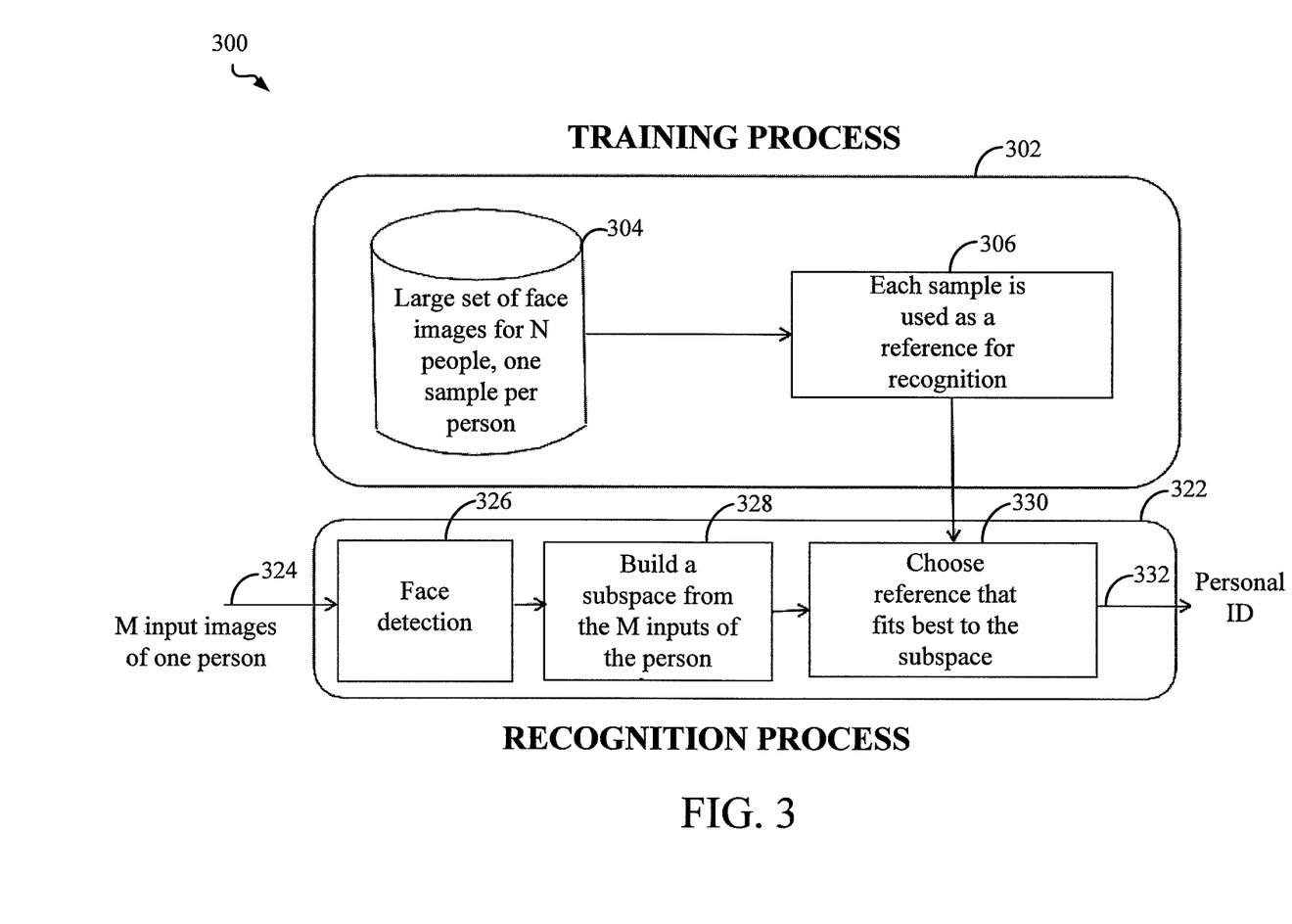
FIG. 3 is a data flow diagram of a method of facial recognition according to one embodiment.

Now turning to FIG. 3, a data flow diagram of a method of facial recognition is shown according to one embodiment and generally denoted 300. The data flow 300 comprises a training process 302 that includes a set of facial images 304 for N people. In this embodiment, the database 304 may only have one reference image available for each person represented by database 304. That is, each identity of the database may be associated with data that is based on one reference image. The associated data, for example, can be a reference image, a compressed version of a reference image, a feature vector generated from a reference image, or the like. It will be appreciated, however, that database 304 can have data being based other applicable numbers of reference images. For example, the database 304 may have one or more identities that are each associated with multiple reference images, and may have other identities that are associated with only one reference image. One advantage, among others, of some embodiments of the present disclosure is that the database 304 may be more practical to produce than databases requiring multiple images for training. A library of multiple images for each subject to be recognized may not be available in many cases. For example, a legacy website may have profiles for each of its users, but only one profile picture for each user. As an additional example, a cellular phone may only permit one picture per contact due to data storage constraints.

In block 306, each sample image is used as a reference for comparison. In some embodiments the reference is a feature vector developed based on the image. If a person of the database 304 has more than one reference image, then a subspace can be generated as a reference. The process of generating a subspace will be described in detail below.

During a recognition process 322, multiple input images 324 of an unknown person are received and input to the face detection block 326. The face detection block 326 identifies portions of the image that contain a face, as well as portions of the face that contain facial features. Various facial detection methods can be used. Some face detection methods, for example, detect a rectangular ROI ("face ROI") around the perimeter of the face of the unknown person, and detect facial features within the ROI. Examples of these facial features may include centers of the mouth and the left and right eyes, inner and outer corners of left and right eyes, left and right corners of the mouth, left and right nostrils, and the center of upper lip. The face detection block 326 can be implemented by executing instructions from the face detection module 132 of FIG. 1.

In block 328, a subspace is built from the faces detected by face detection module 326 in the multiple images 324. In one implementation, a subspace is based on feature vectors. In some embodiments, a feature vector of a given face can be an ordered concatenation of all feature segments of the facial image. A feature segment is a data structure or transformation of the corresponding feature that extracts or summarizes the feature. The process of generating feature vectors will be described in further detail in connection with FIGS. 6A and 6B. A subspace is formed based on the corresponding feature vectors from the multiple input images. For example, the subspace can be generated by applying the maximum, minimum, average, or the like operators, including other pooling operators. Additionally or alternatively, statistical methods can be used to generate a subspace. For example, a mean and a variance of the feature vectors can provide a statistical model of the subspace. Block 328 can be implemented, for example, by executing instructions of the subspace module 124 of FIG. 1.

After building a subspace, the flow 300 moves to block 330, wherein a reference image that most closely matches the subspace is selected from the database 304. For example, recognition may be accomplished by projecting the feature vector of each database reference image into the subspace of the unknown person by executing the instruction of the search module 126, for example. A feature vector of each reference image can computed in a similar process as described above and in FIGS. 6A and 6B. The block 330 can output a personal ID and/or reference image 332 of the person corresponding to the feature vector that has the minimum projection error by, for example, executing the instructions of the recognition module 128 of FIG. 1.

Figure 4:
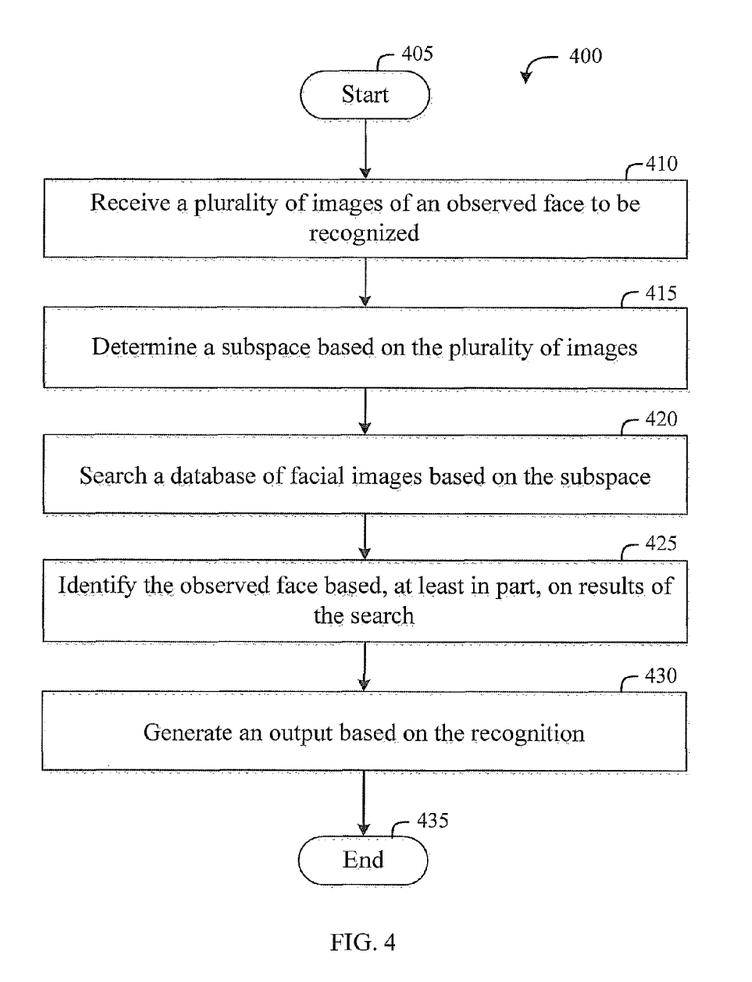
FIG. 4 is a flow diagram showing a method of recognizing an observed face according to one embodiment.

FIG. 4 shows a method 400 of recognizing an observed face according to one embodiment. Method 400 begins at start block 405 and then moves to block 410, where a plurality of images of an observed face to be recognized are received. In some embodiments, the images may be received from a file system or from a network. In another embodiment, the images may be received from an image sensor which captures the images. Images can be received, for example, by using the processor 112 to execute instruction from the image receiver module 120.

In block 415 a subspace is built based on the plurality of received images. In some embodiments building a subspace includes one or more of detecting a face in each of the received images, selecting a subset of the detected faces, generating a feature vector for each of selected faces, and generating a subspace from the generated feature vectors. Subspaces can be generated, for example, by using the processor 112 to execute instruction from the subspace module 124.

In block 420, a reference database of facial images is searched based on the subspace. In some implementations, an image retrieved from the reference database is projected into the subspace. A projection error is then determined. Projection errors can be associated with the images of the reference database. The reference database can be searched, for example, by using the processor 112 to execute instruction from the search module 126 to search the storage 114.

In block 425, the observed face is recognized based at least in part on a result of the search. The observed face can be recognized by various criteria. For example, an image from the database that minimizes the projection error may be recognized as being the observed face. In some embodiments two or more images satisfying a threshold from the database may be recognized as being candidate matches of the observed face. The observed face can be recognized, for example, by using the processor 112 to execute instruction from the recognition module 128.

In block 430, an output is generated based on the recognition. For example, an output may be generated to a display device, indicating the observed face is recognized. Alternatively, a message may be sent over a network indicating that the recognition has occurred. Data related to the recognition, such as the recognized individual's name, address, or other identifying information may also be displayed or sent over the network. In block 435, process 400 terminates. The output can be generated, for example, by using the processor 112 to execute instruction from the I/O module 130 to control the output device 108.

Figure 5:
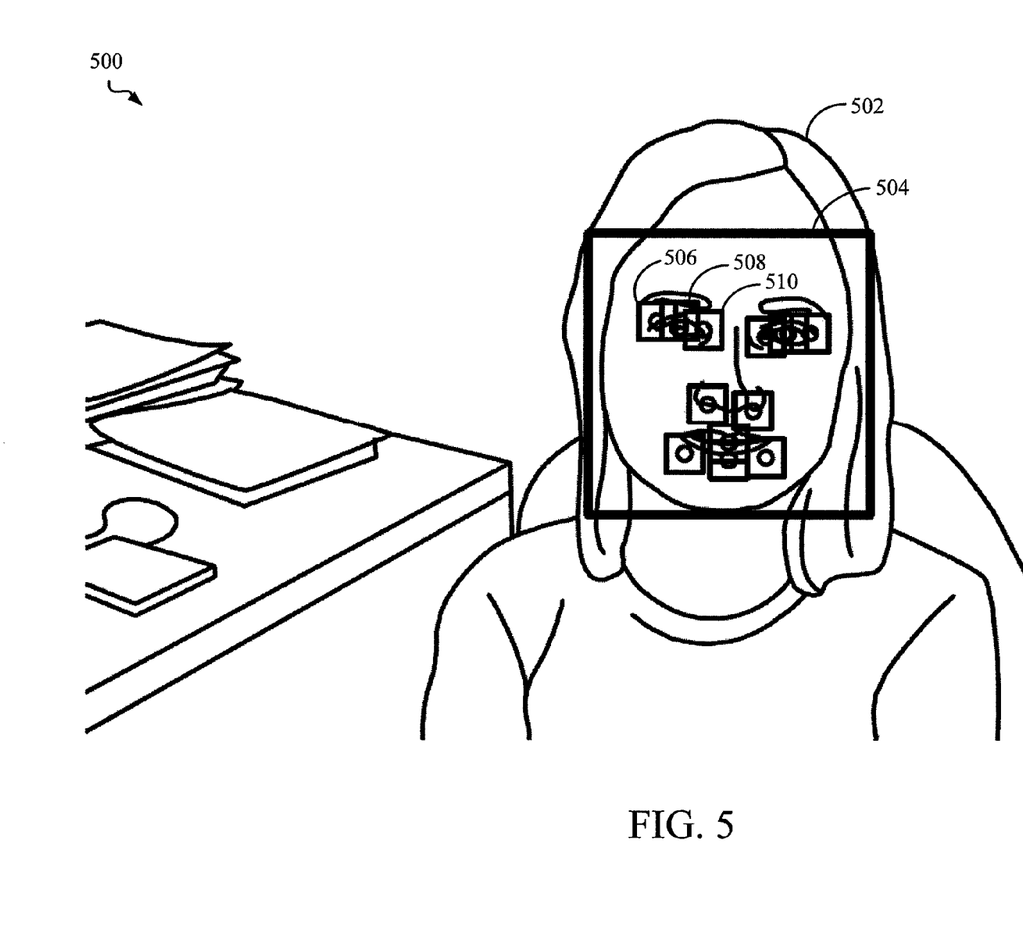
FIG. 5 shows an illustrative example of an image processed with a facial detection algorithm according to one embodiment.

FIG. 5 shows an illustrative example of an image 500 processed with a facial detection algorithm according to one embodiment. The image 500 contains a facial image of a person 502. The facial detection algorithm detects a bounding box 504 around the person's face. The portion within the box 504 can be referred to as a "face ROI." Furthermore, the facial detection method detects facial features (or "feature ROIs") within the bounding box 504. These facial features can include centers of the mouth and the left and right eyes, inner and outer corners of left and right eyes, left and right corners of the mouth, left and right nostrils, and the center of upper lip. A separate bounding box can be created for each of these. For example, the right corner of the right eye has a ROI 506, center of the right eye has a ROI 508, and the left corner of the right eye has a ROI 510.

Figure 6A:
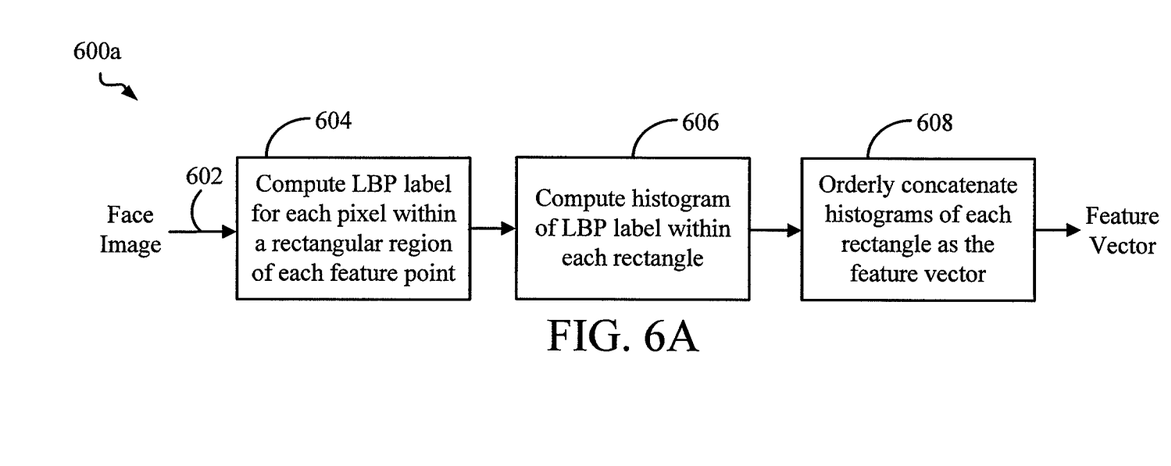
FIG. 6A is a flow chart of a feature extraction process according to one embodiment.

FIG. 6A shows a flow chart of a feature extraction process 600a according to one embodiment. In block 604 a facial image is provided as input 602, where the facial image has been processed by the facial detection module 132. For example, the image 602 can have an ROI about the detected face (for example, a face ROI), as well as an ROI about each detected feature (for example, a feature ROI) within the face ROI. In block 604 a LBP label is computed for each pixel within a rectangular region of each feature point. An example LBP operation will be described below in connection with FIG. 6B. The LBP operation results in a binary pattern at the pixel the LBP operation is applied to. Accordingly, the block 604 results in a binary pattern for each pixel of each feature ROI. In block 606 a histogram of the LBP labels is computed for each feature ROI. In block 608, a feature vector is generated by orderly concatenating the histograms of each feature ROI.

Figure 6B:
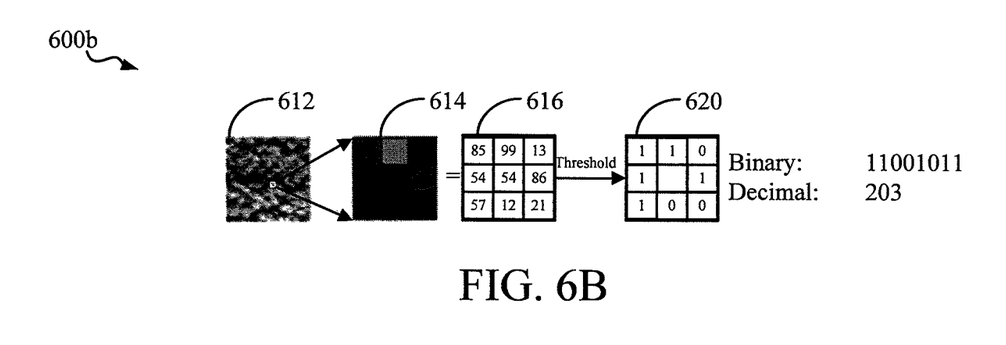
FIG. 6B shows an illustration of a LBP operation applied to a pixel according to one embodiment.

FIG. 6B shows an illustration of a LBP operation 600b applied to a pixel according to one embodiment. An image 612 is a portion of a feature, or a feature ROI. An image 614 shows a 3×3 grey-scale neighborhood about one of the pixels of the image 612. An image 616 shows the decimal representation of the image 614. A thresholding operator is applied to the image 616 to generate the binary pattern 620, and where the center pixel is used as the threshold. That is, pixels are labeled as a "1" if their decimal representation is greater than the center pixel, and otherwise labeled as a "0." As illustrated, the LBP "11001011" is formed by reading out the bits along the edge of the 3×3 neighborhood. In FIG. 6B, the least significant bit corresponds to the upper left bit of the image 620, and the bits of the image 620 are read out clockwise. While FIG. 6B shows a 3×3 neighborhood, it will be appreciated that other applicable neighborhoods can be selected from about 3×3 to about 65×65 neighborhoods.

Figure 7:
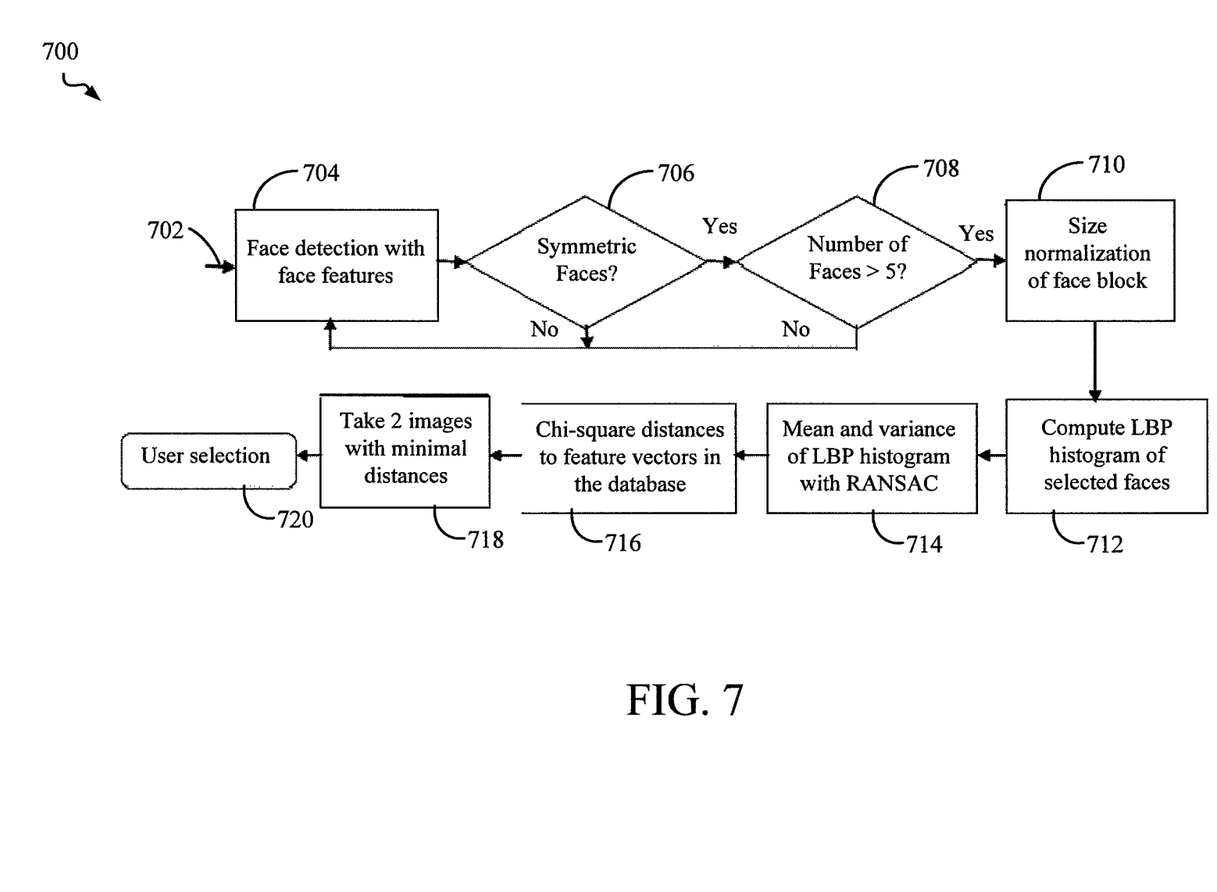
FIG. 7 is a flow diagram of an exemplary embodiment of a facial recognition system.

FIG. 7 shows a block diagram of an exemplary embodiment of a facial recognition system 700. A block 704 receives video input 702 and detects a face in each of the input images using a face detection process, such as the recognition module 128. The video input 702 can be received from, for example, the imaging sensor 106. As stated, the face detection process identifies regions of an input image that contains a face and its associated features.

In block 706 the face detection process selects particular image frames from the video input 702 sequence. The selection, targeted at frontal faces, can be based on the assumption that frontal faces are approximately symmetrical. Specifically, the horizontal center of the face ROI can be computed as a central axis. The following geometric information, among others, can be computed from the detected facial features:

1. The horizontal distances of left side facial features which may include left eye center, left nostril and left corner of mouth to the central axis and of the right side facial. The average difference of the distances for the corresponding pairs may also be computed.
2. The vertical difference of left side and right side facial feature, which may include the left eye and right eye centers, the left and right nostrils, and the left and right mouth corners. The average of all vertical differences may also be computed.
3. The horizontal location difference of the detected mouth center and the computed mouth center from left and right mouth corners may also be computed.
4. The accumulated horizontal location differences of the computed mouth center from left and right mouth corners to the computed eye center and nose center locations.
5. The accumulated vertical location differences of the computed mouth center with the computed eye center and nose center locations.

The frontal face pose is selected if these computed geometric differences are smaller than some predefined thresholds. In addition, blurry image frames may be eliminated from the set of images. Edge and edge width can be used to determine the level of blur. While block 706 was described as targeting frontal faces, it will be appreciated that other applicable orientations can be selected. In some embodiments the targeted orientation can be based on the orientation of a reference image. For example, observed images can be selected if its orientation approximately matches the orientation of a face in a reference image.

In another embodiment, the selection of the observed images can be based on the facial feature of interest. For example, both frontal and profile orientations can be targeted based on which facial feature is currently being analyzed. A profile picture may capture differences in ear features, and this information can be used in conjunction with frontal images for obtaining data on eye spacing, for example.

The image selection process may continue until a threshold number of qualified image frames is reached. For example, in decision block 708 the process 700 continues to block 710 if at least five qualified image frames have been accumulated, and returns to block 704 if less than five qualified image frames have been accumulated. It will be appreciated that other applicable stopping criteria can be selected from the range of about 5 to about 50 selected qualified images.

In block 710 the selected qualified images are normalized to improve comparisons. Normalization can include, for example, up-sampling, down-sampling, and filtering as appropriate. In some embodiments, each facial image is normalized to a specified size, such as an n×m image. In other embodiments, facial images are normalized with respect to a size of another image, such as a reference facial image. Normalization can be performed by executing instruction from, for example, the facial detection module 132.

In block 712 features are extracted from facial images to form feature vectors. A feature vector is a local binary pattern (LBP) centered at the detected feature points of the selected facial images. The LBP pattern is obtained by labeling each pixel with a binary number as a result of applying a threshold to a 3×3-neighborhood of each pixel with the center pixel. The histogram of the labels within the given bounding box of each face feature point forms a feature segment. An ordered concatenation of all feature segments is the feature vector of a given face. The LBP histogram or a feature segment is computed centered at each face feature. An ordered concatenation of the segments can constitute the final feature vector. The operations of block 712 can be performed by executing instructions from the subspace module 124.

After feature vectors are generated from selected images, in block 714 a random sample consensus (RANSAC) algorithm may be used to compute a statistical distribution model (for example, a mean and a variance) of the feature vectors. The RANSAC algorithm can be robust to statistical noise by removing outliers from the data set. The final mean and variance may constitute the statistical subspace representation of the observed or unknown person. The operations of block 714 can be performed by executing instructions from the subspace module 124.

In block 716 the reference image having a feature vector that has the minimal Chi-square distance may be identified as the unknown or observed person. The Chi-square distance can be computed as $$d_i = \sum_{j=1}^{N} (m_j - x_{ij})^2 / (m_j + x_{ij}). \quad \text{(Equation 1)}$$

In Equation 1, m denotes the mean vector of the subspace; $x_i$ denotes the feature vector of the $i^{th}$ person; N is the dimension of the feature vector; and the subscript j denotes the $j^{th}$ component of the associated vector. The operations of block 716 can be performed by executing instructions from the search module 126.

In block 718 the two images are selected from the reference database that have the smallest associated distances $d_i$. These two images are then provided to the user for selection in block 720. In response, the user may select the image that most closely resembles the unknown person. In one embodiment, the reference database can be updated by including the user-selected image of the unknown person. The operations of block 718 can be performed by executing instructions from the search module 126. While the above describes selecting two images, it will be appreciated that any applicable number of images can be selected from about 3 to about 10 images.

The technology is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, processor-based systems, programmable consumer electronics, network PCs, mini-computers, mainframe computers, distributed computing environments that include any of the above systems or devices, and the like.

As used herein, instructions refer to computer-implemented steps for processing information in the system. Instructions can be implemented in software, firmware or hardware and include any type of programmed step undertaken by components of the system.

A processor may be any conventional general purpose single- or multi-chip processor such as the AMD® Athlon® II or Phenom® II processor, Intel® i3®/i5®/i7® processors, Intel Xeon® processor, or any implementation of an ARM® processor. In addition, the processor may be any conventional special purpose processor, including OMAP processors, Qualcomm® processors such as Snapdragon®, or a digital signal processor or a graphics processor. The processor typically has conventional address lines, conventional data lines, and one or more conventional control lines.

The system is comprised of various modules as discussed in detail. As can be appreciated by one of ordinary skill in the art, each of the modules comprises various sub-routines, procedures, definitional statements and macros. Each of the modules are typically separately compiled and linked into a single executable program. Therefore, the description of each of the modules is used for convenience to describe the functionality of the preferred system. Thus, the processes that are undergone by each of the modules may be arbitrarily redistributed to one of the other modules, combined together in a single module, or made available in, for example, a shareable dynamic link library.

The system may be written in any conventional programming language such as C#, C, C++, BASIC, Pascal, or Java, and run under a conventional operating system. C#, C, C++, BASIC, Pascal, Java, and FORTRAN are industry standard programming languages for which many commercial compilers can be used to create executable code. The system may also be written using interpreted languages such as Perl, Python or Ruby.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In one or more example embodiments, the functions and methods described may be implemented in hardware, software, or firmware executed on a processor, or any combination thereof. If implemented in software, the functions may be stored on or transmitted over as one or more instructions or code on a computer-readable medium. Computer-readable media include both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The foregoing description details certain embodiments of the systems, devices, and methods disclosed herein. It will be appreciated, however, that no matter how detailed the foregoing appears in text, the systems, devices, and methods can be practiced in many ways. As is also stated above, it should be noted that the use of particular terminology when describing certain features or aspects of the invention should not be taken to imply that the terminology is being re-defined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment can be included with other depicted embodiments in any combination. For example, any of the various components described herein and/or depicted in the Figures may be combined, interchanged or excluded from other embodiments.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting.

What is claimed is:

1. A computer-implemented method of facial recognition, comprising:
   receiving a plurality of images of an observed face to be recognized during a recognition process;
   generating a template of the observed face based at least on two or more selected images of the plurality of images of the observed face at least as a part of the recognition process, wherein generating the template of the observed face includes generating a subspace of the observed face based at least on feature vectors of the two or more selected images of the plurality of images;
   searching a database of identities and corresponding facial data of known persons, the searching being based at least on the template of the observed face and the facial data of the known persons; and
   selecting one or more identities of the known persons based at least on the search.

2. The computer-implemented method of claim 1, wherein each identity of the database is associated with data that is based on one reference image.

3. The computer-implemented method of claim 1, further comprising capturing the plurality of images of the observed face with an image sensor.

4. The computer-implemented method of claim 1, wherein the feature vectors are based at least on linear binary pattern histograms of the selected images.

5. The computer-implemented method of claim 1, wherein the feature vectors are based at least on a cascade of filtered image blocks.

6. The computer-implemented method of claim 1, wherein the subspace is associated with a mean and a variance of the feature vectors of the two or more selected images of the plurality of images.

7. The computer-implemented method of claim 1, wherein searching the database comprises determining an error measure between the template of the observed face and each of one or more of the corresponding facial data of the known persons.

8. The computer-implemented method of claim 7, wherein the error measure is based on a Chi-square distance.

9. The computer-implemented method of claim 7, wherein the selection of the one or more identities is based on a threshold of the error measure.

10. The computer-implemented method of claim 1, further comprising selecting the two or more images of the plurality of images based on orientation of the observed face.

11. The computer-implemented method of claim 10, wherein the selection of the two or more images of the plurality of images is further based on a facial feature of interest.

12. The computer-implemented method of claim 10, wherein the selection of the two or more images of the plurality of images is further based on facial orientation of the facial data of the database.

13. The computer-implemented method of claim 10, further comprising displaying on a graphical display data indicative of the one or more selected identities.

14. The computer-implemented method of claim 13, further comprising
   prompting a user to confirm the selection of the two or more selected identities; and
   updating the database in response to the confirmation of the user.

15. A facial recognition apparatus, comprising:
   a processor configured to:
      receive a plurality of images of an observed face to be recognized during a recognition process;
      generate a template of the observed face based at least on two or more selected images of the plurality of images of the observed face at least as a part of the recognition process, wherein generating the template of the observed face includes generating a subspace of the observed face based at least on feature vectors of the two or more selected images of the plurality of images;
      search a database of identities and corresponding facial data of known persons, the searching being based at least on the template of the observed face and the facial data of the known persons; and
      select one or more identities of the known persons based at least on the search.

16. The facial recognition apparatus of claim 15, wherein the processor is further configured to transfer data indicative of the selected one or more identities of the known persons, wherein each identity of the database is associated with data that is based on one reference image.

17. The facial recognition apparatus of claim 15, further comprising an image sensor, wherein the processor is further configured to capture multiple images of the observed face from the image sensor.

18. A non-transitory, computer-readable medium storing instructions that, when executed, cause a processor to perform a method comprising of:
   receiving a plurality of images of an observed face to be recognized during a recognition process;
   generating a template of the observed face based at least on two or more selected images of the plurality of images of the observed face at least as a part of the recognition process;
   searching a database of identities and corresponding facial data of known persons, the searching being based at least on the template of the observed face and the facial data of the known persons;
   selecting one or more identities of the known persons based at least on the search; and
   displaying on a graphical display data indicative of the two or more selected identities.

19. The non-transitory, computer readable medium of claim 18, wherein each identity of the database is associated with data that is based on one reference image, and wherein the one or more selected identities are associated with feature vectors within a threshold distance of the template of the observed face.

20. A computer-implemented method of facial recognition, comprising:
   receiving a plurality of images of an observed face to be recognized during a recognition process;

selecting two or more images of the plurality of images, the selection of the two or more images based on orientation of the observed face, the selection of the two or more images based on a facial feature of interest;

generating a template of the observed face based at least on the two or more selected images at least as a part of the recognition process;

searching a database of identities and corresponding facial data of known persons, the searching being based at least on the template of the observed face and the facial data of the known persons; and selecting one or more identities of the known persons based at least on the search.

21. A computer-implemented method of facial recognition, comprising:

receiving a plurality of images of an observed face to be recognized during a recognition process;

selecting two or more images of the plurality of images, the selection of the two or more images based on orientation of the observed face, the selection of the two or more images based on a facial orientation of the facial data of the database;

generating a template of the observed face based at least on the two or more selected images at least as a part of the recognition process;

searching a database of identities and corresponding facial data of known persons, the searching being based at least on the template of the observed face and the facial data of the known persons; and selecting one or more identities of the known persons based at least on the search.

\* \* \* \* \*